United States Patent [19]
Shiotsu et al.

[11] 3,855,160
[45] Dec. 17, 1974

[54] THERMOSETTING FOAMABLE RESINOUS COMPOSITION

[75] Inventors: Tatsuzo Shiotsu; Toshio Adachi, both of Osaka, Japan

[73] Assignee: Leben Utility Co., Ltd., Osaka-shi, Japan

[22] Filed: June 12, 1973

[21] Appl. No.: 369,143

Related U.S. Application Data

[63] Continuation of Ser. No. 192,892, Oct. 27, 1971, abandoned.

[30] Foreign Application Priority Data
Oct. 27, 1970  Japan.............................. 45-93920

[52] U.S. Cl. ............ 260/2.5 N, 161/160, 260/2.5 P, 260/2.5 B, 260/16, 260/17 R, 260/17 A, 260/17.4 GC, 260/30.6 R, 260/31.4 R, 260/31.8 M, 260/31.8 XA, 260/31.8 HA, 260/42.17, 260/42.18, 260/42.22

[51] Int. Cl............................................. C08g 53/10
[58] Field of Search ................................ 260/2.5 N

[56] References Cited
UNITED STATES PATENTS 3,260,688  7/1966  Watanabe et al................ 260/2.5 N
3,227,665  1/1966  Fourcade et al................. 260/2.5 N
3,385,802  5/1968  Trieschock ...................... 260/2.5 N
3,230,184  1/1966  Alford............................. 260/2.5 N
3,642,683  2/1972  Fry.................................. 260/2.5 N
3,232,893  2/1966  Salgado et al. .................. 260/2.5 N

OTHER PUBLICATIONS

"Chemically Loaded Sieves," Union Carbide, July 1, 1959, pages 1–6.

*Primary Examiner*—Morton Foelak
*Attorney, Agent, or Firm*—Waters, Roditi, Schwartz & Nissen

[57] ABSTRACT

This invention relates to a foamable resinous composition comprising a vinyl chloride resin, an unsaturated polyester resin, a polymerization initiator, a reactive plasticizer and a bubbling material, optionally together with a non-reactive plasticizer and/or a vinyl monomer, and to a molded foamed product prepared therefrom which has excellent physical and chemical properties.

11 Claims, 2 Drawing Figures

THERMOSETTING FOAMABLE RESINOUS COMPOSITION

CROSS REFERENCE TO RELATED APPLICATION

This application is a continuation application of Ser. No. 192,892, filed Oct. 27, 1971, now abandoned.

BACKGROUND OF THE INVENTION:

1. Field of the Invention

This invention relates to a foamable resinous composition comprising a vinyl chloride resin, a reactive plasticizer, an unsaturated polyester resin, a polymerization initiator and a bubbling material and to a molded foamed product prepared therefrom.

2. Description of the Prior Art

For the preparation of foam products from thermosetting resins, there have been known the following methods:

1. A method comprising dissolving a volatile substance into the resin or adding a foaming agent into the resin prior to curing under heat, and utilizing a gas formed by gasification, decomposition or other chemical reaction during the curing of the resin.
2. A method comprising incorporating a gas into the resin by agitation or the like to disperse it in the resin prior to the curing of the resin.
3. A method including a combination of both methods (1) and (2).

Generally in thermosetting resins for instance, unsaturated polyester resins, the stability of bubbles after foaming is extremely low and bubbles which will be formed into cells are readily condensed or destroyed in several seconds to several minutes. Thus, if the resin is cured after the foaming, bubbles are condensed or destroyed prior to a gelation of the resin. Therefore, it has been difficult to obtain foamed products of low density having uniform fine cells. Further, even if it is intended to carry out the curing of the unsaturated polyester resins, it is quite difficult to make the curing occur at a proper time after the foaming. For overcoming such a disadvantage, the technique of using a thixotropic agent such as cellulose acetobutyrate has been known. Also a method comprising adding acidic salts of phosphoric acid ester, which are free from a carboxylic acid ester linkage in the molecule, into the unsaturated polyester resins is disclosed in the Japanese Patent Publication No. 1520/64.

Further, there has been known a method comprising forming an anhydrous mixture composed mainly of a polymeric resin and a substance capable of forming a gas with an acid, and further adding an aqueous emulsion, thereby obtaining a foamed product (Japanese Patent Publication No. 2075/64). However, a foamed product having sufficient properties cannot be obtained by these conventional methods.

Heretofore, there has been known a method comprising incorporating in a thermosetting resin a filler composed of fine particles containing a gas or a volatile liquid to obtain a light resinous product, and the product has sometime been called "a foamed resin." However, the fine particles contained in the product are merely embedded in the resin and are present independently from one another while keeping the original state. Of course, the product has not a composite foam structure composed of a skin layer and a layer of continuous foam cells.

Still in addition, there has been known a method of preparing foam articles by mixing a thermosetting rubbery material with a gas-adsorbed zeolite and heating the mixture to allow the gas to escape (Japanese Patent Publication No. 1640/58). However like other conventional methods, this technique fails to give a product having uniform cells.

Moreover, in the conventional methods, breakages, warps and cracks are readily formed during the heating and curing operations, and thus use of the products is much limited because of their poor mechanical properties, chemical resistance and weather-proofing.

DETAILED DESCRIPTION OF THE INVENTION

Figure 1:
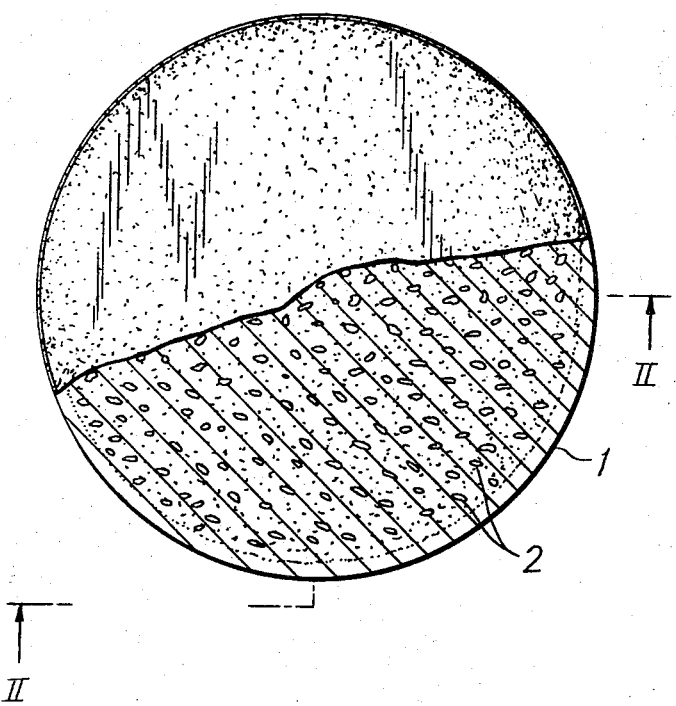
FIG. 1 is a plan view partially cut away illustrating a foamed product obtained by charging a composition of this invention in a round mold, and heating.
Figure 2:
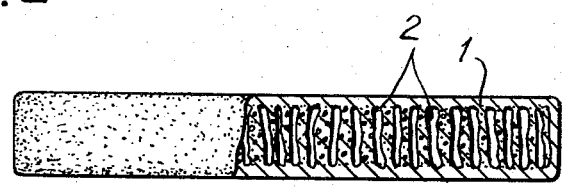
FIG. 2 is an elevational view partially cut away, taken along the line II—II of FIG. 1.

This invention relates to a resinous composition composed mainly of a vinyl chloride resin, a reactive plasticizer, an unsaturated polyester resin, a polymerization initiator and a bubbling material, and to a foamed product obtained therefrom which has a smooth surface and is characterized by a composite cell layer structure composed of a high density skin layer and an inner layer of stockade-like, continuous cells.

The primary object of the invention is to provide a thermosetting foamable resinous composition of good stability from which it is possible to prepare readily the foam product which has a sufficient surface hardness, little shrinkage, is combustible and has excellent physical and chemical properties.

The main ingredients of the composition may be blended together, for instance, by the following methods:

1. A method comprising dispersing powders of the vinyl chloride resin by a known method into the reactive plasticizer or a mixture of the reactive plasticizer with the non-reactive plasticizer to form a polyvinyl chloride plastisol, and incorporating in the resulting plastisol (a) a solution of the unsaturated polyester resin in the reactive plasticizer, (b) and (b) a mixed solution of the unsaturated polyester resin, the reactive plasticizer and the vinyl monomer.
2. A method comprising dispersing powders of the vinyl chloride resin directly into (a) a solution of the unsaturated polyester in the reactive plasticizer, (b) a solution of the unsaturated polyester resin in the vinyl monomer, or (c) a mixed solution of the unsaturated polyester resin, the reactive plasticizer and the vinyl monomer.

The bubbling material may be added to the polyvinyl chloride plastisol in the case of method (1), or to the unsaturated polyester resin solution in either method (1) or (2). It is also possible to add the bubbling material to the mixture of the polyvinyl chloride plastisol and the unsaturated polyester resin solution.

In order to increase the storage stability (for instance to prevent undesired high viscosity) of the composition of this invention, it is preferable to adopt a method comprising mixing the powders of a vinyl chloride resin with the reactive plasticizer, or the mixture of the reactive plasticizer and non-reactive plasticizer, whereby covering a surface of the vinyl chloride resin powder with the plasticizer, and then incorporating into the unsaturated polyester resin solution containing the vinyl monomer and other ingredients. By adopting this method, a direct contact of the vinyl chloride resin powder with the vinyl monomer having a relatively high dissolving power can be prevented, and a dissolution or swelling of the vinyl chloride resin does occur, whereby the storage stability of the composition is improved.

When the reactive plasticizer is added to the mixture of vinyl chloride resin and the unsaturated polyester resin as in this invention, the compatibility between the vinyl chloride resin and the unsaturated polyester resin can be improved and a violent increase of the viscosity of the resulting composition can be greatly controlled. Therefore, the composition can be stored quite well at room temperature with good stability, and either the dispersion state or dispersion stability of the bubbling material incorporated in the composition can be kept in good condition. Further, the foamed product prepared by heat-curing of the composition is improved not only in mechanical properties, such as surface hardness and mechanical strength, and chemical properties, such as resistance against chemicals, oils or solvents, but also in electrical properties.

In general, heating at temperatures exceeding 180°C. has been required for melting, foaming and molding of the polyvinyl chloride plastisol. Especially, when a thick molded product is wanted, it is necessary to elevate the temperatures of an interior part of the starting composition, and therefore, it takes a long time to accomplish the heat curing.

In contrast, since the heating is effected in the presence of a polymerization initiator in the composition of this invention, the vinyl type monomer contained in the unsaturated polyester resin with the aid of the plasticizer promotes the melting and molding of the vinyl chloride resin, whereby the molding of the composition may be accomplished even at a relatively low temperatures, for instance, at about 120°C. Further, the heat of the polymerization generated by a cross-linking reaction and a formation of net-work structure of the unsaturated polyester resin, vinyl monomer and reactive plasticizer increases the temperature of the interior of the molded composition. Thus, even the case where the thick molded foamed product is prepared, the curing can be accomplished within a short time. Coincidentally, discharge of a gas which is formed by melting, decomposition, and the like of the bubbling materials or a gas adsorbed in the bubbling material is taken place.

In the composition of this invention, the heat of polymerization is stored in an inner part. Thus, the decomposition and melting of the bubbling material and the discharge of gas in the inner part arise before the cross-linking and curing of the composition, whereby the stockade-like continuous cells having a diameter of 0.5 – 2.0 mm are formed in the inner part.

On the other hand, in the outer part of the molded composition, i.e., in a depth of up to several centimeters from the surface, the cross-linking and curing of the composition take place before the decomposition and melting of the bubbling material and the discharge of gas. Thus, formation of the stockade-like continuous cells are prevented, but a skin layer having fine uniform cells is formed.

Accordingly, it is important in this invention that, during the step of the curing, the composition must have a suitable flowability which will not prevent the foaming and a suitable viscosity inhibiting the disappearance of formed cells which is caused by breakages of resin films positioned in the vicinity of the cells.

The foaming and curing mechanism of the composition containing the bubbling material will now be detailed by referring to accompanying drawings.

1. The composition of the invention is at first placed in a suitable mold, and heated at a temperature of 50°–180°C. The part subjected to direct contact with the mold is heated and cured by a cross-linking reaction. In this part, the curing occurs at a higher rate than the decomposition and melting of the bubbling material and the discharge of gas. Thus, the composition is cured and the formation of bubbles is prevented. As a result, there is formed the skin layer (1) having a rather compact structure of a low foaming ratio in this part.

2. In the interior part which is not in direct contact with the mold, the composition is gradually heated by heat transfer, whereby its flowability becomes high. At the same time, the discharge of gas which will bring about the formation of the bubbles occurs due to heating of the bubbling material.

3. Further, particles of the vinyl chloride resin are also subject to heating, whereby they are swollen, softened or molten with the reactive plasticizer, nonreactive plasticizer or vinyl monomer, and the composition shows a high viscosity. Thus, the bubbles are not destroyed and do not disappear. The bubbles move upwardly and leave hollow, stockade-like voids (2).

4. Then, the cross-linking reaction occurs in the highly viscous resin containing the stockade-like voids 2 and the resin loses the flowability and is cured in the state that the bubbles are completely maintained therein.

In the above foaming and curing step, the presence of a suitable amount of a volatile liquid component, namely a substance having a boiling point lower than 140°C., such as the vinyl monomer or an ordinary solvent, is suitable for increasing the ratio of foaming (expansion). Such volatile liquid component is heated during the foaming and curing step, and the temperature reaches the boiling point thereof. In this state, it is postulated that the bubbling material exhibits a zeolite-like action in conventional boiling, and thus promotes the gasification of the volatile liquid component thereby increasing the amount of gas. However, conventional solvents have a tendency toward condensation during the foaming and curing step, and remain in the resulting foamed and cured products, which results in a lowering of the mechanical properties of the products, and causes an offensive smell. For these reasons, the use of ordinary solvents is not preferred. On the other hand, vinyl monomers are preferably incorporated into the composition, since they do not cause such disadvantages.

In ordinary unsaturated polyester resins or diallyl phthalate resins which are free of the vinyl chloride resin, a suitable flowability and a balance between the discharge rate of gas and the rate of the cross-linking reaction cannot be attained. Therefore, it is impossible to obtain a foam product having the stockade-like structure of uniform cells with a high foaming ratio.

In conventional compositions comprising mainly a polyvinyl chloride resin, it is necessary to heat them at temperatures exceeding 180°C. and to conduct the heating treatment for a very long time so as to melt the inner part of the composition when thick molded articles are desired.

In accordance with the present invention, the heating of the composition for molding may be carried out at a temperature of 50°– 250°C., for a period of 10 seconds to 1 hour under a pressure of 0 – 300 kg/cm². The composition of the present invention may be molded generally by matched metal die molding, transfer molding, injection molding, casting molding, etc.

In this invention, it is also possible to prepare composite laminate boards which have specific acoustic properties and are heat-insulating, and have excellent surface hardness and abrasion resistance, by coating the composition of the invention thickly on substrates such as plywoods, hard boards, chip boards, ligneous boards, asbestos boards and slate plates, and then heating and curing.

The vinyl chloride resin to be used in the composition of this invention includes a homopolymer of vinyl chloride and a copolymer of vinyl chloride with another monomer copolymerizable therewith. Namely, it includes copolymers of vinyl chloride with vinyl acetate, vinyl propionate, methyl methacrylate, butyl acrylate, vinylidene chloride, acrylonitrile, vinyl ether, diethyl maleate, acrylic acid, methacrylic acid, maleic anhydride, fumaric acid, itaconic acid and the like. It further includes a saponified product of a copolymer of vinyl chloride with vinyl acetate.

For obtaining molded articles having excellent physical properties, It is important that such homopolymer or copolymer of vinyl chloride should be highly polymerized, and it is generally preferable to use a homopolymer or copolymer of vinyl chloride having a degree of polymerization ranging from 500 to 2,500. Preferable average particle sizes of the vinyl chloride resin are from 0.05 to 50 microns, especially from 0.2 to 2 microns. It is best to use a homopolymer of vinyl chloride or a copolymer of vinyl chloride with vinyl acetate containing 95 - 99 percent by weight of vinyl chloride which is used for plastisols. In order to obtain a plastisol of low viscosity, it is possible to use a coarse vinyl chloride resin as an extender having a particle size of 5 – 100 microns in combination with such homopolymer or copolymer of vinyl chloride.

In the composition of this invention, it is preferred that the vinyl chloride resin be used in an amount of 5 – 70 percent by weight based on the total composition. It is impossible to obtain a product having excellent flexibility and flame resistance, when used in less than 5 percent by weight. In contrast, the viscosity of the composition is too high, and good moldability and processability cannot be obtained, when used in an amount exceeding 70 percent by weight. Further, the heat distortion temperature is lowered, whereby it becomes impractical.

The reactive plasticizer to be used in the composition of this invention is an acrylic acid ester plasticizer expressed by the general formula

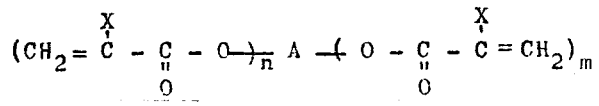

wherein A is a residue of a compound having at least two hydroxy groups at molecule ends, or a compound having at least one ester or ether linkage in a molecule and at least two terminal hydroxy groups; X stands for a hydrogen or halogen atom or an alkyl group, such as methyl and ethyl; and $n$ and $m$ are integers of 1 to 3.

As the reactive plasticizer, there may be examplified ethyleneglycol dimethacrylate, propyleneglycol dimethacrylate, 1,3-butanediol dimethacrylate, 1,4-butanediol dimethacrylate, 2,3-butanediol dimethacrylate, 2-ethyl-1,3-hexanediol dimethacrylate, 1,5-pentanediol dimethacrylate, 1,6-hexanediol dimethacrylate, neopentylglycol dimethacrylate, glycerin trimethacrylate, dimethacryl (bis-diethyleneglycol) phthalate, dimethacryl di-(bis-diethyleneglycol) phthalate, dimethacryl (bis-diethyleneglycol) maleate, tetramethacryl (bis-glycerin) phthalate, triethyleneglycol dimethacrylate, tetramethyleneglycol dimethacrylate, polyethyleneglycol dimethacrylate, and trimethylolpropane trimethacrylate.

In addition, there may be used allyl type reactive plasticizers such as tri allyl acrylate, allyl cyanurate, diallyl maleate, diallyl itaconate, diallyl sebacate, diallyl adipate, diallyl glycolate, triallyl aconitate, diallyl monooctyl phosphate, triallyl phosphate, diallyl isophthalate and diallylbenzene phosphate.

These reactive plasticizers may be used in combination.

Preferable proportions of the reactive plasticizer in the composition of this invention are not more than 60 percent by weight and not less than 2 percent by weight in the case of the composition free from the non-reactive plasticizer or the vinyl monomer, and not more than 50 percent by weight and not less than 2 percent by weight in the case of the composition containing the non-reactive plasticizer or the vinyl monomer.

When the reactive plasticizer is mixed in the amount exceeding 60 percent by weight (or 50 percent by weight), the storage stability of the composition is lowered, and the mechanical properties of the resulting molded product are not improved but are rather poor.

These reactive plasticizers are found to exhibit an effect of increasing the compatibility between the vinyl chloride resin and the unsaturated polyester resin, and to be also effective for improving mechanical properties and heat distortion temperature of the resulting molded foamed product. However, in view of the curing rate, reactive plasticizers of an acrylic acid ester type are most preferred, because they exhibit the highest curing rate among the above-mentioned reactive plasticizers.

As the unsaturated polyester resin to be used in the composition of this invention, there may be used commercially available ones for preparing molded articles, decorative plates, laminated plates, coatings and the like. More specifically, there may be used unsaturated polyester resins formed by condensation of unsaturated dibasic acids with polyhydric alcohols. As the unsaturated dibasic acids there may be exemplified maleic acid, maleic anhydride and fumaric acid. Itaconic acid is also usable in some cases. As the aromatic dibasic acid there, phthalic anhydride, isophthalic acid, terephthalic acid and chlorinated phthalic acid. As the polyhydric alcohols there may be used, for instance, ethyleneglycol, diethyleneglycol, propyleneglycol, dipropyleneglycol, 1,3-butanediol, 2,3-butanediol, neopentylglycol, hydrogenated bisphenol A 2,2'-bis(4'-hydroxyphenyl)propane, and 2,2-di-(4-hydroxypropoxyphenyl)-propane.

It is desired that the unsaturated polyester resin have an average degree of condensation of at least 4 and a number average molecular weight of 1,000 or more. In the case of an unsaturated polyester resin having a molecular weight of less than 1,000, the mechanical properties of the final cured product are poor. Thus, use of such polyester resin is not preferred.

It is desired that the unsaturated polyester resin be incorporated in an amount of 5 – 70 percent by weight in the composition of this invention. The object of the invention, for instance the improvement of the mechanical properties of the cured formed product cannot be attained, when used in an amount foamed 5 percent by weight. In an amount exceeding 70 percent by weight, it is difficult to obtain a composition having good fluidity, and to expect good mechanical properties of the final cured product.

In view of the ratio of foaming, the cell uniformity and the reproducibility of foaming, it is preferable to use an unsaturated polyester resin prepared by employing isophthalic acid as the unsaturated dibasic acid component. Unsaturated polyester resins formed by employing other unsaturated dibasic acids are somewhat inferior in the above-mentioned points.

The vinyl monomer referred to in the present invention includes monomers having at least one double bond in the molecule. As the monomers, there may be exemplified styrene, vinyl acetate, methyl methacrylate, butyl acrylate, chlorostyrene, divinyl benzene and acrylonitrile. The vinyl monomer is mixed into the composition for the purpose of adjusting the viscosity of the composition and improving hardness, chemcial resistance and mechanical properties of the resulting foam product.

The vinyl monomer is incorporated in an amount not more than 40 percent by weight, and preferably not less than 2 percent by weight. Where more than 40 percent by weight, o volume shrinkage of the final foam product is too high, and it is often difficult to obtain the desired composite cell structure.

As the non-reactive plasticizers, there may be used any of the conventional non-reactive plasticizers for polyvinyl chloride, such as phthalic acid esters, e.g., dibutyl phthalate, diamyl phthalate, dimethoxyethyl phthalate, dibutoxyethyl phthalate, dicyclohexyl phthalate, dihexyl phthalate, diheptyl phthalate, butyl octyl phthalate, di-(n-octyl) phthalate, di-(2-ethylhexyl) phthalate, diisooctyl phthalate, didecyl phthalate, didodecyl phthalate and benzyl phthalate; phosphates, e.g., alkyl diphenyl phosphate and tricresyl phosphate; and other non-reactive plasticizers, e.g., dicapryl, didecyl, and di-2-ethylhexyl esters of adipic acid, succinic acid, azelaic acid and sebasic acid. In addition, conventional polyester- and epoxy-type plasticizers for ordinary vinyl chloride resins may be used in combination with the above-exemplified non-reactive plasticizers. It is preferable to use the plasticizers which do not affect the fluidity or storage stability of the polyvinyl chloride plastisol. These plasticizers may be used in admixtures of two or more plasticizers.

In accordance with the present invention, the nonreactive plasticizer is incorporated in an amount not more than 50 percent by weight, preferably 5 – 50 percent by weight. When the non-reactive plasticizer is incorporated in an amount not more than 50 percent by weight, the viscosity and the fluidity during molding of the composition formed from the unsaturated polyester resin and vinyl chloride resin are improved, whereby the curing rate of the composition can be controlled conveniently. Further, the incorporation of the non-reactive plasticizer exhibits the effect of improving the flexibility of the final molded, cured product. In case the non-reactive plasticizer is incorporated in an amount exceeding 50 percent by weight, the mechanical properties of the final product become poor.

As the polymerization initiator to be used in this invention, there may be exemplified organic peroxides, such as acetyl peroxide, methyl ethyl Ketone peroxide, lauroyl peroxide, benzoyl peroxide, tertiarybutyl perbenzoate, di-tertiary-butyl peroxide, hydroxycyclohexyl hydroperoxide and cumene hydroperoxide; and azo-type catalysts, such as $\alpha,\alpha'$-azobisisobutyronitrile. These polymerization initiators may be used in the form of an admixture of two or more of them.

The polymerization initiator is incorporated in the composition of the invention in an amount ranging from 0.02 percent to 3.0 percent by weight.

The bubbling material to be used in this invention includes fine particles containing gas, liquid or easily gas-forming solid. As the substance constituting the fine particles, there may be exemplified phenol, epoxy, polyethylene, polyurethane, polypropylene, polystyrene, polyacrylic, polyester, polybutadiene, polyamide, polyisoprene, silicone and cellulose type resins, and gelatin, polyvinyl alcohol, vinyl chloride/ethylene copolymer resins, and inorganic substances such as glass.

As the gas contained in the fine particles, there may be exemplified inert gases such as helium, neon and argon, and non-combustible gases such as air, nitrogen, carbon dioxide, ammonia gas and Freon (Tradename made by E. I. Du Pont de Nemours & Company). As the liquid contained in the fine particles, there may be exemplified saturated hydrocarbons such as ethane, propane, butane, pentane, hexane and heptane, solvents such as petroleum ether, benzene and carbon tetrachloride and also water. As the easily gas-forming solid, there may be examplified inorganic salts capable of forming a gas under heating by decomposition such as ammonium carbonate and sodium bicarbonate, azo compounds such as dinitrosopentamethylene tetramine, azobisisobutyronitrile, toluenesulfonyl hydrazide derivatives and p-toluenesulfone azide, and in addition substances capable of sublimation such as camphor and naphthalene may be contained.

In this invention it is important that these fine particles should be capable of releasing or discharging the gas at a temperature up to the curing temperature of the composition.

More concretely, the bubbling material comprises;
1. hollow fine particles of 5 $\beta$- 2 mm in size consisting of glass or a resinous substance containing the inert gas, the non-combustible gas or the saturated hydrocarbon, for instance, glass microballoons, shirasu-glass microballoons, pearlite microballoons, phenolic resin microballoons and butane-containing polystyrene beads;
2. microcapsules of resinous substances containing the liquid and/or solid, such as low boiling point liquids, inorganic salts, azo compounds and substances capable of sublimation, or a mixture of the resinous substances with a small amount of the gas; and
3. particles of molecular sieve type adsorbents capable of adsorbing selectively a great amount of the inert gas, the non-combustible gas, the saturated hydrocarbon or the low boiling point liquid, for instance, zeolite.

Physical properties of the glass microballoons (sold under the trademark "Microballoon IG–101" by Emerson & Cuming, Inc.) and the shirasu-glass microballoons mentioned in (1) are tabulated below;

|  | Shirasu-Glass Microballoon | Microballoon IG-101 |
|---|---|---|
| Appearance | white to faintly brown powder | white powder |
| Composition | aluminum silicate | sodium borosilicate |
| Apparent density (−) | 0.33 – 0.67 | 0.33 |
| Volume density (−) | 0.14 – 0.32 | 0.22 |
| Particle size distribution ($\mu$) | 30 – 600 | 10 – 250 |
| Average particle size ($\mu$) | — | 65 |
| Particle wall thickness($\mu$) | 6 – 14 | 2 |
| Softening initiation temperature(°C.) | 900 – 1000 | 480 |
| Melting point(°C.) | 1200 – 1300 | 760 |
| Heat conductivity (keal/m.h. °C.) | 0.07 | 0.056 |
| Hygroscopicity(24 hours; %) | 0.08 | 2.8 |

(The preparation of the shirasu-glass microballoons is detailed in Engineering Materials (Kogyo Zairyo), Vol. 19, No. 8, pp. 84–89).

Any of the above types (1), (2) and (3) of bubbling materials is effectively used in the composition of the invention. However, in view of the ratio of foaming, the uniformity in the stockade-like structure of the product and the reproducibility of foaming, use of bubbling materials of type (1) is most preferred, and the bubbling materials of types (2) and (3) are inferior to those of type (1) in the above points.

The bubbling material is incorporated in the composition in an amount of 1 – 80 percent by weight, preferably 5 – 50 percent by weight.

In addition to the above-mentioned ingredients, the composition of the present invention may further contain the conventional additives such as stabilizers for vinyl chloride resins, pigments, reinforcers, fillers, coloring agents, lubricants, assistants, visocosity-improvers, etc. Moreover, it is possible to incorporate into the composition of the invention glass fibers, carbon fibers, boron fibers, asbestos, metallic fibers, natural fibers such as flax fibers and wood chips, or synthetic fibers such as polyester, acrylic, vinylon or polyamide fibers; magnetic iron powder or powders of other metals; or silica, graphite or the like.

The foamed product obtained by heat curing of the composition has a smooth surface and is characterized by a so-called composite cellular structure composed of a high denisty skin layer and a layer having stockade-like, continuous voids. By dint of such structural characteristics, the foamed product prepared from the composition exhibits good heat and electrical insulating properties and peculiar acoustic properties.

In foaming and molding of the composition, a good releasing effect from the mold is observed in spite of low shrinkage and high dimensional stability. Further, the foamed product not only has a lustrous surface, but also excellent mechanical properties, such as abrasion and shock resistance, and exhibits good chemical, water, heat, and flame resistance, and good weatherproofing.

The foamed product having such excellent properties can be conveniently and advantageously utilized in various fields. For instance, they may be used as heat-insulating materials, heat-insulating architectural materials, acoustical architectural materials, heat-insulating materials for refrigerators, and ducts and tubes of air-conditioning apparatuses, interior and exterior decorating materials, and household implements or utensils such as tiles, stools, bathtubs and furniture. They may be also used for construction of hulls of yachts and boats, and as interior decorating materials for airplanes.

This invention will now be detailed by referring to Examples where all of the "parts" and "percentages" are on the weight basis.

EXAMPLE 1

100 Parts of a vinyl chloride resin for plastisal having an average degree of polymerization of 1,700 were mixed with 60 parts of trimethylolpropane trimethacrylate and 3 parts of a stabilizer for vinyl chloride resin (Zn/Cd/Ba liquid organic complex), and the mixture was defoamed under reduced pressure to form a polyvinyl chloride plastisol.

Separately, a 2-liter capacity 4-neck flask equipped with a stirrer, a hygrometer, a thermometer, a reflux cooler with a partial condenser and a nitrogen gas-introducing tube was charged with 1:1 moles of propyleneglycol, 0.5 mole of dimethyl terephthalate and 0.5 mole of maleic anhydride together with 0.15 percent based on the above charge of sodium formate and 6 percent based on the above charge of xylene. In a nitrogen gas atmosphere the temperature was raiseed from 160°C. to 195°C. Over a period of time of 4 hours, while withdrawing methanol formed by the reaction. The reaction was continued for 5 hours at 190°C. and then the pressure inside the flask was reduced to distill off the xylene. Thus, there was obtained an unsaturated polyester resin A having an acid value of 15, an average degree of condensation of 14 and a number average molecular weight of 1,260.

Then, an unsaturated polyester resin solution A-1 was prepared by dissolving 120 parts of the thus prepared unsaturated polyester resin A into 80 parts of trimethylolpropane trimethacrylate and adding thereto 0.05 percent of hydroquinone.

200 Parts of the thus formed unsaturated polyester resin solution A-1 were mixed with 160 parts of the above polyvinyl chloride plastisol and 3 parts of benzoyl peroxide, and 30 parts of phenol resin microballons containing nitrogen gas occluded therein were added to the mixture and dispersed therein to form a thermosetting foamable composition (Sample No. 1). The composition was poured into a mold and heated at 140°C. for 20 minutes under contact pressure to obtain the desired foamed product. This foamed product (15 mm in thickness and 300 mm × 300 mm in size) had a rigid surface which was smooth and lustrous, and from observation of the longitudinal section it was seen that in a portion of a depth of up to about 2.5 mm from the surface there was formed a high density skin layer and in a deeper portion there was formed a layer of stockade-like continuous cells. Physical properties of the foamed product are shown in Table 1.

Table 1

| Properties of Foamed and Molded Product | Sample No. 1 (this invention) | Remarks |
| --- | --- | --- |
| Specific gravity | 0.7 | |
| Surface hardness (Rockwell R scale) | 123 | ASTM D-785 |
| Flexural strength (kg/mm$^2$) | 68 | JIS K-6911 |
| Impact test (falling ball method) | standing the test | ball weight = 100 g falling height = 50 cm |
| Heat distortion temperature | 110°C. | ASTM D-648(264 psi) |
| Flame resistance | self-extinguishing | ASTM D-1692-59T |

EXAMPLE 2

The following ingredients were well mixed and dispersed in the same manner as in Example 1:

| | |
| --- | --- |
| Vinyl chloride resin having an average degree of polymerization of 1700 | 100 parts |
| Ethyleneglycol dimethacrylate | 80 parts |
| Stabilizer (Zn/Cd/Ba liquid organic complex) | 3 parts |
| Tert.-butyl perbenzoate | 1.5 parts |
| Unsaturated polyester resin A | 100 parts |
| Microballoons of sodium borosilicate glass | 28 parts |

The resulting composition (Sample No. 2) was poured into a mold and heated at 140°C. for 20 minutes under contact pressure to obtain the desired molded resin product. This molded foamed product had a white, rigid, smooth surface layer, and from observation of the longitudinal section thereof it was seen that the product had a composite cellular structure composed of a high density skin layer and a layer of stockade-like continuous cells. The properties of the molded foamed product were as excellent as those of the product obtained in Example 1.

EXAMPLE 3

The following ingredients were mixed and dispersed in the same manner as in Example 1:

| | |
| --- | --- |
| Vinyl chloride resin having an average degree of polymerization of 900 | 100 parts |
| Di-(2-ethylhexyl) phthalate | 50 parts |
| Stabilizer (Zn/Cd/Ba liquid organic complex) | 3 parts |
| Tert.-butyl perbenzoate | 1 parts |
| Unsaturated polyester resin A | 100 parts |
| Diallyl phthalate | 50 parts |

The resulting composition was incorporated with 20 parts of sodium borosilicate glass microballoons and 35 parts of chopped strand glass fiber, and they were dispersed well to obtain a thermosetting foamable composition (Sample No. 3). The composition was poured into a mold and heated at 160°C. for 20 minutes under contact pressure to obtain a glass fiber-reinforced, molded foamed product. Properties of this molded foamed product are shown in Table 2.

Table 2

| | Sample No. 3 (this invention) |
| --- | --- |
| Appearance of molded product | smooth and rigid surface layer |
| Foamed state (seen in the longitudinal section) | high density skin layer and inner layer of stockade-like, continuous cells. |
| Properties of molded product | |
| Specific gravity | 0.9 |
| Surface hardness (Rockwell (M scale) (ASTM D-785) | 59 |
| Flexural strength (kg/mm$^2$) (JIS K-6911) | 40 |

EXAMPLE 4

The following ingredients were mixed and dispersed in the same manner as in Example 1 to obtain a thermosetting foamable composition (Sample No. 4):

| | Sample No. 4 (This invention) |
| --- | --- |
| Vinyl chloride resin (average degree of polymerization of 1650) | 100 parts |
| Tricresyl phosphate | 30 parts |
| Di-(2-ethylhexyl) phthalate | 30 parts |
| Stabilizer (organotin laurate) | 3 parts |
| Benzoyl peroxide | 1 parts |
| Unsaturated polyester resin solution A-1 | 160 parts |
| Butane-occluding polystyrene beads | 25 parts |

The composition of Sample No. 4 was poured into a mold and heated at 140°C. for 20 minutes under contact pressure to obtain the desired molded foamed product. This product exhibited a cellular structure similar to that of the product of Example 1 and its mechanical properties are as excellent as those of the product of Example 1.

EXAMPLE 5

A polyvinyl chloride plastisol was prepared by mixing 80 parts of a vinyl chloride resin having an average degree of polymerization of 1,700 and 20 parts of another vinyl chloride resin having an average degree of polymerization of 900 with 60 parts of trimethylolpropane trimethacrylate, 3 parts of a stabilizer for vinyl chloride resin (organotin laurate) and 2 parts of tert.-butyl perbenzoate, and subjecting the resulting mixture to defoaming treatment under reduced pressure.

The same reactor as used in Example 1 was charged with 1.1 moles of neopentylglycol, 0.5 mole of isophthalic acid, and 0.5 mole of phthalic anhydride, and they were reacted in a nitrogen gas atmosphere at 150 – 180°C. for 4 hours and subsequently at 200° – 220°C. for 4 hours while removing water formed by the reaction. Thus, there was obtained an unsaturated polyester resin B characterized by an acid value of 19, and average degree of condensation of 13 and a number average molecular weight of 1,290. The unsaturated polyester resin B was mixed with 40 percent, based on the resulting solution of styrene and 0.01 percent, based on the resulting solution, of hydroquinone to obtain an unsaturated polyester resin solution B–1. Then, 150 parts of the thus formed solution B–1 were well mixed with 150 parts of the above polyvinyl chloride plastisol and 30 parts of phenolic resin microballoons containing, occluded therein, nitrogen gas to form a thermosetting foamable composition (Sample No. 6). For comparison, in the same manner as above there were formed compositions without employing the unsaturated polyester resin solution B–1 (Sample No. 5) or the polyvinyl chloride plastisol (Sample No. 7). These compositions were compared with respect to the dispersion stability of the microballons and the cured and foamed state. Results are shown in Table 3.

Table 3

|  | Sample No. 5 (comparison) | Sample No. 6 (this invention) | Sample No. 7 (comparison) |
|---|---|---|---|
| Formulation (parts) |  |  |  |
| Polyvinyl chloride plastisol | 300 | 150 | — |
| Unsaturated polyester resin solution B-1 | — | 150 | 300 |
| Nitrogen gas-occluding phenol resin microballoons | 30 | 30 | 30 |
| Dispersion Stability |  |  |  |
| Just after dispersing | good | good | good |
| Standing still 30 minutes after dispersing | good | good | microballoons separated and gathered in upper portion |
| Standing still 1 day after dispersing | good | good | same as above |
| Curing and foaming |  |  |  |
| curing conditions | 180°C. 15 min. | 140°C. 20 min. | 80°C. 1 hr. |
| foamed state | not foamed | high density skin layer and inner layer of stockade-like, continuous cells | not foamed |

Example 6

| Formulation (parts) | Sample No. 8 (this invention) | Sample No. 9 (this invention) | Sample No. 10 (this invention) | Sample No. 11 (this invention) |
|---|---|---|---|---|
| Vinyl chloride resin (average degree of polymerization of 1700) | 100 | 100 | 100 | 100 |
| Ethyleneglycol dimethacrylate | 60 | 60 | 60 | 60 |
| Mercaptan tin laurate complex | 3 | 3 | 3 | 3 |
| Unsaturated polyester resin solution B-1 | 250 | 250 | 250 | 250 |
| Benzoyl peroxide | 3 | 3 | 3 | 3 |
| Sodium borosilicate glass microballoons | 30 | — | — | — |
| Carbon dioxide gas-adsorbed zeolite | — | 30 | — | — |
| Nitrogen gas-occluding phenol resin microballoons | — | — | 30 | — |
| Butane gas-occluding polystyrene resin beads | — | — | — | 30 |

Table 4

| Foamed and molded product | Sample No. 8 (this invention) | Sample No. 9 (this invention) | Sample No. 10 (this invention) | Sample No. 11 (this invention) |
|---|---|---|---|---|
| Appearance | smooth, lustrous, rigid surface layer | | | |
| Specific gravity | 0.61 | 0.55 | 0.60 | 0.58 |
| Foamed state | composite cellular structure composed of skin layer and inner layer of stockade-like, continuous cells | | | |
| Hardness (Rockwell R scale) | 120 | 120 | 118 | 99 |
| Flame resistance | self-extinguishing | self-extinguishing | self-extinguishing | self-extinguishing |

EXAMPLE 6

Composition having a formulation indicated in Table 4 were prepared by mixing and dispersing the ingredients in the same manner as in Example 5. Each of the compositions was poured into a mold and heated at 140°C. for 20 minutes under mold contact pressure.

EXAMPLE 8

Compositions of the formulations indicated in Table 5 (Samples Nos. 14, 15 and 16) were cured and foamed at 140°C. for 20 minutes, and the foaming states and physical properties of the products were examined. Results are shown in Table 5.

Table 5

| Formulation (parts) | Sample No. 14 (comparison) | Sample No. 15 (this invention) | Example No. 16 (this invention) |
|---|---|---|---|
| Vinyl chloride resin (average degree of polymerization of 1700) | 100 | 100 | 100 |
| Di-(2-ethylhexyl) phthalate | 30 | 30 | 30 |
| Ethyleneglycol dimethacrylate | 30 | 30 | 30 |
| Stabilizer (Cd/Ba/Zn liquid organic complex) | 3 | 3 | 3 |
| Benzoyl peroxide | 1 | 1 | 1 |
| Unsaturated polyester resin solution B-1 | 160 | 160 | 160 |
| Volcanic glass microballoons | 3 | 100 | 300 |
| Results of Examination | | | |
| Foamed state (longitudinal section) | not foamed | high density skin layer and inner layer of stockade-like, continuous cells | high density skin layer and inner layer of stockade-like, continuous cells |
| Specific gravity | 1.10 | 0.55 | 0.40 |
| Hardness (Rockwell R scale) | 124 | 89 | 85 |
| Falling ball impact test (ball weight= 100 g; falling height = 50 cm) | standing the test | standing the test | standing the test |

The resulting molded foamed products were compared with one another. Results are shown in Table 4.

EXAMPLE 7

Compositions of the following formulations (Sample Nos. 12 and 13) were cured and foamed under the same conditions, namely at 140°C. for 20 minutes, and the states of the molded foamed products were examined.

| Formulation (parts) | Sample No. 12 (this invention) | Sample No. 13 (comparison) |
|---|---|---|
| Vinyl chloride resin (average degree of polymerization of 1700) | 100 | — |
| Di-(2-ethylhexyl)phthalate | 30 | — |
| Trimethylolpropane trimethacrylate | 30 | — |
| Stabilizer (Cd/Ba/Zn liquid organic complex) | 3 | — |
| Tert.-butyl perbenzoate | 1 | 1 |
| Unsaturated polyester resin solution B-1 | 160 | 320 |
| Nitrogen gas-occluding phenol resin microballoons | 32 | 32 |

The molded foamed product prepared from the composition of Sample No. 12 had a smooth, rigid surface layer, and from observation of the longitudinal section it was seen that the product had a composite cellular structure composed of a high density skin layer and an inner layer of stockade-like, continuous cells.

In the product prepared from the composition of Sample No. 13, the microballoons were present independently in the upper portion of the product, and the desired molded foamed product could not be obtained. For comparison, the composition of Sample No. 13 was cured and foamed at 80°C. for 1 hour, but there could not be obtained the desired molded foamed product.

What we claim is:

1. A thermosetting foamable resinous composition which consists essentially of (1) 5–70 percent by weight of a vinyl chloride resin having an average degree of polymerization of 500 to 2500 and a particle size of 0.05 – 50 microns, (2) 5–70 percent by weight of an unsaturated polyester resin having an average condensation degree of at least 4 and a number average molecular weight of 1,000 or more, (3) 2–60 percent by weight of a reactive plasticizer having the general formula,

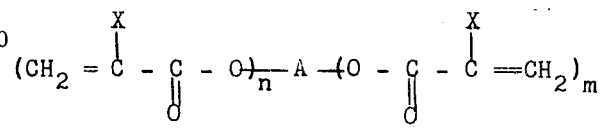

wherein A is a residue of a compound having at least two hydroxy group at molecule ends, or a compound having at least one ester or ether linkage in a molecule and at least two terminal hydroxy groups; X stands for a hydrogen or halogen atom, or an alkyl group such as methyl and ethyl; and n and m are an integer of 1 to 3, (4) 0.02 – 3 percent by weight of a polymerization initiator, and (5) 1 – 80 percent by weight of a bubbling material selected from the group consisting of; (a) hollow fine particles (b) microcapsules o resins and (c) fine particles of molecular sieve type adsorbents, said material containing a gas or a substance capable of releasing a gas at a temperature lower than the curing temperature of the composition.

2. The thermosetting foamable resinous composition in accordance with claim 1, wherein said vinyl chloride resin is a homopolymer of vinyl chloride or a copolymer of vinyl chloride with another monomer selected from the group consisting of vinyl acetate, vinyl propionate, methyl methacrylate, butyl acrylate, vinylidene chloride, acrylonitrile, vinyl ether, diethyl maleate, acrylic acid, methacrylic acid and maleic anhydride.

3. A thermosetting foamable resinous composition in accordance with claim 1, wherein said hollow fine particles are glass microballoons, shirasu-glass microballoons, pearlite microballoons, phenolic resin microballoons or butane-containing polystyrene beads.

4. The thermosetting foamable resinous composition in accordance with claim 1, wherein said microcapsules include low boiling point liquids, inorganic salts capable of releasing or discharging gas at a temperature up to the curing temperature of the composition, azo compounds or substances capable of sublimation.

5. The thermosetting foamable resinous compositions in accordance with claim 1, wherein said adsorbents are zeolite 6. The thermosetting foamable resinous composition in accordance with claim 1 wherein the amount of the reactive plasticizer is 2–50 percent by weight, and not more than 50 percent by weight of a non-reactive plasticizer is incorporated.

7. The thermosetting foamable resinous composition in accordance with claim 1, wherein the amount of the reactive plasticizer is 2–50 percent by weight, and not more than 40 percent by weight of a vinyl monomer is incorporated.

8. The thermosetting foamable resinous composition in accordance with claim 1 wherein the amount of the reactive plasticizer is 2–50 percent by weight, and not more than 50 percent by weight of a non-reactive plasticizer and not more than 40 percent by weight of a vinyl monomer are incorporated.

9. The thermosetting foamable resinous composition in accordance with claim 7 wherein the vinyl monomer is at least one compound selected from the group consisting of styrene, vinyl acetate, methyl methacrylate, butyl acrylate, chlorostyrene, divinyl benzene and acrylonitrile.

10. The thermosetting foamable resinous composition in accordance with claim 1, which further comprises a reinforcing material selected from the group consisting of asbestos, carbon fibers, glass fibers, boron fibers, synthetic fibers, natural fibers and metallic fibers.

11. A molded cellular resinous article consisting essentially of the cured product obtained by heating the composition of claim 1 in a mold, and characterized by a high density skin layer containing fine uniform cells in the outer part of the molded article and stockade-like continuous cells in the inner part of the molded article.

* * * * *

UNITED STATES PATENT AND TRADEMARK OFFICE
CERTIFICATE OF CORRECTION

PATENT NO. : 3,835,160
DATED : September 10, 1974
INVENTOR(S) : Masato Tanabe

It is certified that error appears in the above-identified patent and that said Letters Patent are hereby corrected as shown below:

Column 1, lines 57 and 58, "and a hydroazone derivative," should read --and a hydrazone derivative,--. Column 5, Diagram F, first one, " " should read --  --. Column 13, line 70, "-6-keto-66$^7$-," should read --6-keto-$\Delta^7$-,--. Column 14, line 56, "(compound I, R=CH$_3$)" should read --(compound I', R=CH$_3$)--. Column 14, line 57, "(compound I, R is hydrogen)" should read --(compound I', R is hydrogen)--. Column 14, line 63, "-17$\beta$-ol3-one-" should read --17$\beta$-ol-3-one--. Column 15, line 9, "formula I." should read --formula I'--. Column 16, lines 1 and 2, "-17$\beta$-ol-5-one (compund I, R is methyl)" should read --17$\beta$-ol-5-one (compound I, R is methyl)--. Column 19, line 49, "-17$\alpha$-ol-5-one-" should read --17$\beta$-ol-5-one--. Column 19, line 63, "-17$\alpha$-ol-5-one," should read --17$\beta$-ol-5-one,--. Column 20, line 1, "-5,17$\alpha$-diol-" should read --5,17$\beta$-diol--. Column 20, line 17, "-5,17$\alpha$-diol-" should read --5,17$\beta$-diol--. Column 20, line 39, "my invention concept" should read --my inventive concept--. Column 20, lines 62 and 63, "Elute first and benzene" should read --Elute first with benzene--. Column 21, line 36, "6.15 $\mu$ (CXC);" should read --6.15 $\mu$ (C=C);--. Column 22, line 10, "-22$\alpha$,25$\alpha$-" should read -22$\alpha$,25a-. Column 22, line 20, "liters of water" should read --liters of ice water--. Column 22, line 40, "aqueous bicarbonate" should read --aqueous sodium bicarbonate--. Column 22, line 57, "of 4.5-seco-" should read --of 4,5-seco--. Column 24, line 19, "-17$\beta$-ol-e,5-dione" should read --17$\beta$-ol-3,5-dione--. Column 25, line 21, "When the organic" should read --Wash the organic--. Column 26, line 2, "C. 6,6-Di-(2-Propenyl)-" should read --C. 6,6-Di-(2'-Propenyl)--. Column 26, line 4, "of 6.6-(2'-propenyl)-" should read --of 6,6-di-(2'-propenyl)--. Column 28, line 42, "(0.227 g.)" should read --(0.277 g.)--. Column 29, line 58, "$\delta^{film}_{max}$" should read --$\lambda^{film}_{max}$--. Column 30, line 26, "$\delta^{film}_{max}$" should read --$\lambda^{film}_{max}$--. Column 30, line 60, "$\delta^{film}_{max}$" should read --$\lambda^{film}_{max}$--. Column 32, line 69, "$\delta^{Nujol}_{max}$" should

UNITED STATES PATENT AND TRADEMARK OFFICE
CERTIFICATE OF CORRECTION

PATENT NO. : 3,835,160
DATED : September 10, 1974
INVENTOR(S) : Masato Tanabe

It is certified that error appears in the above-identified patent and that said Letters Patent are hereby corrected as shown below:

read -- $\lambda_{max}^{Nujol}$ --. Column 33, line 14, "$\delta_{max}^{Nujol}$" should read -- $\lambda_{max}^{Nujol}$ --. Column 34, line 10, "comprising 10B-n-" should read --comprising 10β-n--. Column 34, line 15, "C. 10β-n-Proply-" should read --C. 10β-n-Propyl--. Column 34, line 37, "percent dioxane with mecuric" should read --% aqueous dioxane with mercuric-- Column 36, line 51, "-6,610β-tri-" should read --6,6,10β-tri--. Column 36, lines 64 and 65, "-5.58 → 6.75 (OTHP, $C_{17}$-H); 9.11 5.85 9.13 τ--" should read --5.85 → 6.75 (OTHP, $C_{17}$-H); 9.11 and 9.13 τ--. Column 44, line 30, "-$C_{19}$-$CH_3$); ($C_6$-$CH_3$);" should read --$C_{19}$-$CH_3$); 8.87 ($C_6$-$CH_3$);--. Column 44, line 63, "on 75 g. Florisile" should read --on 75 g. Florisil--. Column 44, line 69, "5.85 ($Ch_3$-C=O);" should read --5.85 ($CH_3$-C=O);--. Column 45, lines 33 and 34, "-17α,20-isopropylidenedioxy-isopropylidenedioxy-4,5-seco-pregnane-2,5-dione;" should read --17α,20-isopropylidenedioxy-4,5-seco-pregnane-3,5-dione;--. Column 47, line 27, "$\delta_{max}^{nujol}$" should read --$\lambda_{max}^{nujol}$--. Column 47, line 66, "$\delta_{max}^{nujol}$" should read --$\lambda_{max}^{nujol}$--. Column 48, line 37, "-3-estryn-17β28-ol-" should read --3-estryn-17β-ol--. Column 49, line 53, "to obtaine" should read --to obtain--. Column 52, line 2, "-4-pregnen11β-" should read --4-pregnen-11β--. Column 52, line 47, "-17β,20-" should read --17α,20--. Column 55, line 46, "A. 4,5Oxido-" should read --A. 4,5-Oxido--. Column 58, line 37, "12. gα-Fluoro-11β-" should read --12. 9α-Fluoro-11β--. Column 58, line 41, "15. 9α-Fluoro-11α-" should read --15. 9α-Fluoro-11β--. Column 58, line 55, "3. 11β-Acetoxy-17β,20-" should read --3. 11β-Acetoxy-17α,20--. Column 59, line 2, "12. 9α-Fluro-" should read --12. 9α-Fluoro--. Column 61, line 56, "17. 11β-Acetoxy16β-methyl-" should read -17. 11β-Acetoxy-16β-methyl--. Column 62, lines 9 and 10, "-4-seco-" should read --4,5-seco--. Column 64, line 43, Claim 2, "hydrogen." should read --hydrogen and alkanoyl),--. Column 64, lines 64, 65 and 66, Claim 4, "-p-toluenesulfonylhydrazine in a lower alkanol having up to 4 carbon atoms," should read --p-toluenesulfonylhydrazine, said process

UNITED STATES PATENT AND TRADEMARK OFFICE
CERTIFICATE OF CORRECTION

PATENT NO. : 3,835,160
DATED : September 10, 1974
INVENTOR(S) : Masato Tanabe

It is certified that error appears in the above—identified patent and that said Letters Patent are hereby corrected as shown below:

comprising--. Column 64, line 70, Claim 4, "hydrazono" should read --hydrazone--.

Signed and Sealed this

Thirty-first Day of August 1976

[SEAL]

Attest:

RUTH C. MASON
Attesting Officer

C. MARSHALL DANN
Commissioner of Patents and Trademarks